United States Patent Office 3,448,126
Patented June 3, 1969

3,448,126
3-OXYGENATED 19-NORPREGNA-1,3,5(10),17(20)-
TETRAEN-21-ALS AND ENOL ESTERS THEREOF
Walter R. Benn, Deerfield, Ill., assignor to G. D. Searle
& Co., Chicago, Ill., a corporation of Delaware
No Drawing. Filed Feb. 27, 1967, Ser. No. 619,019
Int. Cl. C07c *169/34*
U.S. Cl. 260—397.47                 10 Claims

ABSTRACT OF THE DISCLOSURE 3-oxygenated 19 - norpregna - 1,3,5(10),17(20)-tetraen-21-als and enol esters thereof useful as pharmacological agents, as evidenced by their hypocholesterolemic, estrogenic, anti-fertility, anti-inflammatory, progrestational and anti-hypertensive properties, and preparable by the silver ion catalyzed rearrangement of the corresponding 3-oxygenated 17α-ethynylestra-1,3,5(10)-trien-17β-ol 17-esters followed by hydrolysis of the resulting enol esters.

---

The present invention is concerned with novel steroidal chemical compounds characterized by an α, β-unsaturated aldehyde group and with corresponding enol esters also. These compounds are, more particularly, described as 3-oxygenated 19-norpregna-1,3,5(10),17(20)-tetraen-21-als and the enol esters thereof which can be represented by the following structural formulae

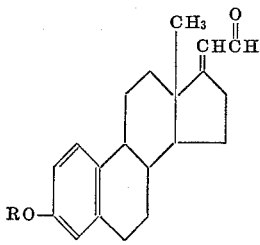

and

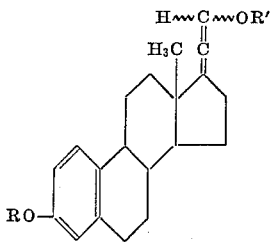

wherein R can be hydrogen or a lower alkyl or lower alkanoyl radical, R' is a lower alkanoyl radical, and the wavy line denotes the alternative α or β stereochemical configuration.

The term "lower alkyl" as represented by the R variable includes radicals exemplified by methyl, ethyl, propyl, butyl, pentyl, hexyl, heptyl and the branched-chain radicals thereof.

Typical of the lower alkanoyl radicals symbolized by R and R' in the foregoing structural formula are formyl, acetyl, propionyl, butyryl, valeryl, caproyl, heptanoyl and the branched-chain groups isomeric therewith.

The compounds of the invention are conveniently manufactured by processes which utilize as starting materials compounds of the following structural formula

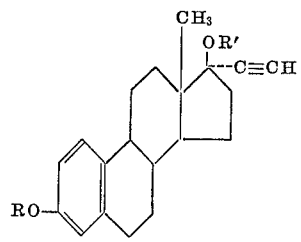

wherein R and R' are as hereinbefore defined. Rearrangement of those starting materials to afford the instant enol esters is effected by heating with a suitable silver salt, preferably in an inert organic solvent medium. Silver salts suitable for this purpose are, for example, silver perchlorate, silver tetrafluoroborate and silver trifluoroacetate. Especially preferred organic solvents are those capable of solubilizing both the steroid starting material and the silver salt. Acetone, diethyl ketone, chlorobenzene, ethylene chloride, chloroform and carbon tetrachloride are representative examples. The presence of a soluble organic base such as tetramethylguanidine or pyridine provides the advantage of inhibiting the hydrolysis of the enol ester to the corresponding aldehyde. A specific example of this process is the reaction of 17α-ethynylestra-1,3,5(10)-triene-3,17β-diol 3,17-diacetate with silver perchlorate in acetone containing tetramethylguanidine to afford 19-norpregna-1,3,5(10),17(20),20-pentaene - 3,21 - diol 3,21-diacetate.

When silver acetate in a mixture of acetic acid and acetic anhydride is used in the aforementioned process, the corresponding 19-norpregna-1,3,5(10),16,20-pentane enol acetates are produced. In that manner, 17α-ethynylestra-1,3,5(10)-triene-3,17β-diol 3,17-diacetate, for example is converted to 19-norpregna-1,3,5(10),16,20-pentaene-3,21-diol 3,21-diacetate.

The instant enol esters are obtained as mixtures of the 21α and 21β isomers. Those mixtures are separated by fractional crystallization to afford the individual pure isomers.

Hydrolysis of the instant enol esters to afford the corresponding aldehydes is effected by a variety of reagents, for example, aqueous potassium hydroxide, potassium carbonate or sodium bicarbonate in methanol, 80% aqueous acetic acid, aqueous formic acid or aqueous mineral acids such as hydrochloric or sulfuric in a suitable solvent such as tetrahydrofuran or dioxane. Most of these hydrolytic procedures result in production of the aldehydes possessing the more stable $\Delta^{17,(20)}$ trans stereochemical configuration. The use of 80% aqueous acetic acid results in a mixture of the cis and trans isomers which are separable by fractional crystallization. As a specific example, the isomeric mixture of 19-nor-21-acetoxypregna-1,3,5(10), 17(20), 20-pentaen-3-ol 3-methyl ether is heated with 80% aqueous acetic acid to produce an isomeric mixture of 3-methoxy-19-norpregna-1,3,5(10),17(20)-tetraen-21- al, which is fractionally crystallized to afford the individual cis and trans isomers.

The cis and trans stereochemical configurations are represented by the following structural formulae

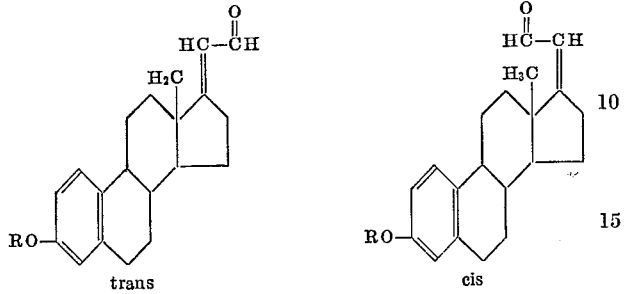

trans           cis

The instant 3-(lower alkanoyl)oxy aldehydes are alternatively obtained by acylation of the corresponding 3-hydroxy compounds, suitably by means of a lower alkanoic acid anhydride or halide, preferably in the presence of an acid acceptor. 3-hydroxy-19-norpregna-1,3,5(10),17(20)-tetraen-21-al is thus contacted with acetic anhydride and pyridine to yield 3-acetoxy-19-norpregna-1,3,5(10),17(20)-tetraen-21-al.

When the aforementioned 17α-ethynyl-17β-hydroxy starting materials are contacted with a disubstituted chlorophosphine, rearrangement occurs, resulting in the corresponding 19-norpregna-1,3,5(10),17(20),20-pentaenyl disubstituted phosphine oxides. 17α-ethynylestra-1,3,5(10)-triene-3,17β-diol 3-methyl ether is thus contacted with diphenyl chlorophosphine in chloroform containing pyridine at room temperature for about 48 hours to afford 3-methoxy-19-norpregna-1,3,5(10),17(20),20-pentaen-21-yl diphenyl phosphine oxide.

The compounds of this invention are useful in view of their valuable pharmacological properties. They are, for example, hormonal and anti-hormonal agents, as is evidenced by their estrogenic, progestational, anti-inflammatory and anti-fertility properties. They exhibit also hypocholesterolemic and anti-hypertensive activity.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.). Quantities of materials are expressed in parts by weight unless otherwise noted.

EXAMPLE 1

A solution containing 15.65 parts of 17α-ethynylestra-1,3,5(10)-triene-3,17β-diol 17-monoacetate, 0.666 part of silver perchlorate, 0.5 part of tetramethylguanidine and 400 parts of acetone is heated at the reflux temperature, under nitrogen, for about 98 hours, then is cooled and diluted with approximately 5 parts by volume of saturated aqueous ammonium chloride. The diluted mixture is allowed to stand for about 15 minutes, and the precipitated silver salts which form are removed by filtration and discarded. The filtrate is concentrated, and the resulting crystalline product is collected by filtration, then purified by recrystallization from ethyl acetate to yield 19-norpregna-1,3,5(10),17(20),20-pentaene - 3,21α - diol 21-acetate, melting at about 206–208° and displaying an optical rotation, in chloroform, of −6°. This compound displays infrared absorption maxima, in a potassium bromide disc, at 2.92, 3.23, 5.01, 5.80, 6.03, 6.61, 6.87, 7.84, 8.17, 9.52, 11.49 and 12.79 microns and nuclear magnetic resonance peaks at about 54, 128, 305, 393, 411 and 438 cycles per second. It is represented by the following structural formula

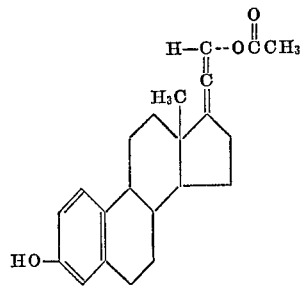

The ethyl acetate mother liquors from the foregoing recrystallization are concentrated to dryness to afford 19 - norpregna - 1,3,5(10),17(20),20 - pentaene - 3,21β-diol 21-acetate.

EXAMPLE 2

When an equivalent quantity of 17α-ethynyl-estra-1,3,5(10)-triene-3,17β-diol 17-propionate is subjected to the processes of Example 1, there is produced 19-norpregna-1,3,5(10),17(20),20 - pentaene-3,21α-diol 21-propionate and 19 - norpregna - 1,3,5(10),17(20),20-pentaene-3,21β-diol propionate.

EXAMPLE 3

To a solution of 5.2 parts of 19-norpregna-1,3,5(10),17(20),20-pentaene-3,21α-diol 21-acetate in 240 parts of methanol is added 15 parts by volume of saturated aqueous sodium bicarbonate, and the resulting reaction mixture is heated at the reflux temperature, under nitrogen, for about 1 hour, then is concentrated under reduced pressure to induce crystallization. The resulting pale yellow prismatic crystals are isolated by filtration and purified by recrystallization from acetone-methylcyclohexane to yield trans-3-hydroxy-19-norpregna - 1,3,5(10),17(20)-tetraen-21-al, melting at about 243–248°. Infrared absorption maxima are observed, in a potassium bromide disc, at about 3.05, 6.05, 6.31, 6.65, 6.80, 7.75, 7.99 and 8.65 microns. Nuclear magnetic resonance maxima appear at 46, 348, 356, 418–433, 595 and 603 cycles per second. This compound is structurally illustrated by the following formula

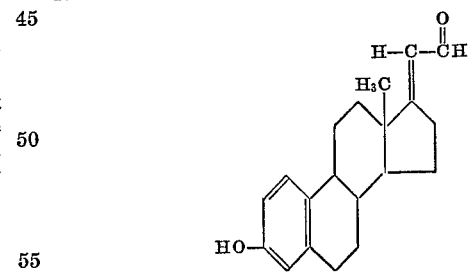

EXAMPLE 4

A solution containing 16.5 parts of 17α-ethynylestra-1,3,5(10)-triene-3,17β-diol 3,17-diacetate, 0.512 part of silver perchlorate, 0.25 part of tetramethylguanidine and 400 parts of acetone is refluxed in a nitrogen atmosphere for about 4 days, then is diluted with approximately 5 parts by volume of saturated aqueous ammonium chloride and stirred for approximately 15 minutes. The precipitated inorganic salts are removed by filtration, and the filtrate is concentrated in order to allow crystallization to take place. The resulting crystalline product consists of an equal mixture of the 21α and 21β isomers of 19-norpregna-1,3,5(10),17(20),20-pentaene-3,21-diol 3,21 - diacetate. Recrystallization of that crude mixture from acetone-pentane results in platelet-like crystals of 19-norpregna-1,3,5(10),17(20),20-pentaene-3,21α-diol 3,21-diacetate, which exhibits a melting point at about 145-148°, an optical rotation, in chloroform, of about −12.5°, infrared absorption maxima, in a potassium bromide disc, at about 3.25, 5.04, 5.68, 6.21, 6.31, 6.68, 8.20 and 9.68 microns and nuclear magnetic resonance peaks at about 54, 127.5, 136, 407, 424 and 440.5 cycles per second. This compound is represented by the following structural formula

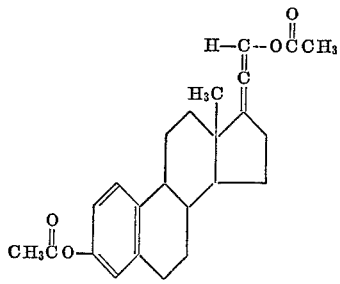

The mother liquor from the latter recrystallization is concentrated to dryness under reduced pressure to afford 19 - norpregna - 1,3,5(10),17(20),20 - pentanene - 3,21β-diol 3,21-diacetate, which exhibits nuclear magnetic resonance peaks at about 58.5, 127.5, 136, 407, 424 and 445 cycles per second.

EXAMPLE 5

When an equivalent quantity of 17α-ethynylestra-1,3,5(10)-triene-3,17β-diol 3,17-dipropionate is substituted in the procedure of Example 4, there are produced 19-norpregna - 1,3,5(10),17(20),20 - pentaene - 3,21α - diol 3,21-dipropionate and 19-norpregna-1,3,5(10),17(20),20-pentaene-3,21β-diol 3,21-dipropionate.

EXAMPLE 6

A solution containing 17.6 parts of 17α-ethynyl-3-methoxyestra-1,3,5(10)-trien-17β-ol acetate, 0.653 part of silver perchlorate, 0.5 part of tetramethylguanidine and 400 parts of acetone is refluxed in a nitrogen atmosphere for about 70 hours, then is diluted with approximately 2 parts by volume of saturated aqueous sodium chloride and 2 parts by volume of saturated aqueous sodium bicarbonate. The resulting precipitate is removed by filtration and discarded. The filtrates are concentrated under reduced pressure to afford a gum-like residue, which is extracted into benzene and chromatographed on a silica gel column. The column is eluted with 2% ethyl acetate in benzene to afford an equimolar mixture of the 21α and 21β isomers of 21-acetoxy-19-norpregna-1,3,5(10),17(20),20-pentaen-3-ol 3-methyl ether as a colorless glass-like residue, characterized by an optical rotation, in chloroform, of +25°, infrared absorption maxima at about 3.30, 5.05, 5.71, 6.21, 6.34, 6.64, 8.01 and 9.60 microns and nuclear magnetic resonance peaks at about 54, 58.5, 128.5, 399, 418 and 435–450 cycles per second.

Fractional crystallization of the aforementioned isomeric mixture from aqueous methanol results in 21α-acetoxy - 19 - norpregna - 1,3,5(10),17(20),20-pentaen-3-ol 3-methyl ether, characterized by nuclear magnetic resonance peaks at about 54, 128.5, 399, 418, and 435–450 cycles per second, and 21β-acetoxy-19-norpregna-1,3,5(10),17(20),20-pentaen-3-ol 3-methyl ether, which exhibits nuclear magnetic resonance maxima at about 58.5, 128.5, 399, 418 and 435–450 cycles per second.

EXAMPLE 7

When an equivalent quantity of 17β-acetoxy-17α-ethynylestra-1,3,5(10)-trien-3-ol 3-ethyl ether is substituted in the procedure of Example 6, there are produced 21α-acetoxy - 19-norpregna-1,3,5(10),17(20),20-pentaen-3-ol 3-ethyl ether and 21β-acetoxy-19-norpregna-1,3,5(10),17(20),20-pentaen-3-ol 3-ethyl ether.

EXAMPLE 8

A solution of 7.6 parts of the equimolar isomeric mixture of 21-acetoxy-19-norpregna - 1,3,5(10),17(20),20-pantaen-3-ol 3-methyl ether, described in Example 6, in 80 parts of methanol containing 0.2 part of potassium hydroxide is heated on the steam bath, under nitrogen, for about 30 minutes, then is partially concentrated by distillation under reduced pressure in order to promote crystallization of the product. That crystalline material is separated by filtration and further purified by recrystallization from acetone-pentane to afford trans-3-methoxy-19-norpregna - 1,3,5(10),17(20) - tetraen-21-al, melting at about 170–172°. This compound exhibits an optical rotation of +63.5° in chloroform and is further characterized by infrared absorption peaks at about 3.63, 5.98, 6.10, 6.22, 6.67, 8.10, 8.58, 8.83, 9.62, 11.37 and 12.21 microns and nuclear magnetic resonance peaks at about 54.5, 229, 344.5, 352.5, 399, 418, 591 and 599 cycles per second. It is represented by the following structural formula

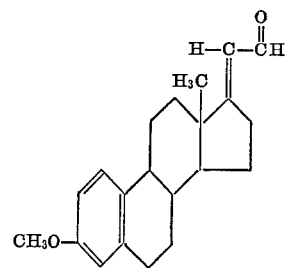

EXAMPLE 9

The hydrolysis of 21α-acetoxy-19-norpregna-1,3,5(10),17(20),20-pentaen-3-ol 3-methyl ether or 21β-acetoxy-19-norpregna-1,3,5(10),17(20),20 - pentaen-3-ol 3-ethyl ether or a mixture of the two isomers by the procedure described in Example 8 results in 3-ethoxy-19-norpregna-1,3,5(10),17(20)-tetraen-21-al.

EXAMPLE 10

A mixture containing 1 part of 3-hydroxy-19-norpregna-1,3,5(10),17(20)-tetraen-21-al, 10 parts of acetic anhydride and 20 parts of pyridine is allowed to stand at room temperature for about 16 hours, then is poured carefully into a mixture of ice and water. Extraction of that aqueous mixture with benzene affords an organic solution, which is dried over anhydrous magnesium sulfate, then stripped of solvent by careful distillation under reduced pressure to afford 3-acetoxy - 19 - norpregna-1,3,5(10),17(20)-tetraen-21-al.

EXAMPLE 11

A solution of 7.6 parts of the equilmolar isomeric mixture of 21-acetoxy-19-norpregna-1,3,5(10),17(20),20-pentaen-3-ol 3-methyl ether in 100 parts by volume of 80% acetic acid is heated on the steam bath for about 30 minutes, then is diluted with water. The resulting gummy precipitate is extracted into ether, and the organic solution is washed with dilute aqueous sodium bicarbonate, dried over anhydrous magnesium sulfate, then stripped of solvent under reduced pressure. The resulting solid product is recrystallized from acetone-pentane to afford trans-3-methoxy-19-norpregna - 1,3,5(10),17(20)-tetraen-21-al, identical with the product of Example 8.

Concentration of the acetone-pentane mother liquors to dryness under reduced pressure affords cis-3-methoxy-19-norpregna-1,3,5(10),17(20)-tetraen-21-al, represented by the following structural formula

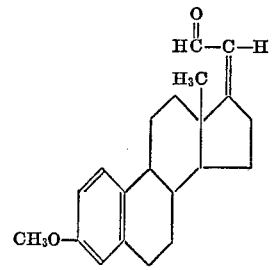

What is claimed is:
1. A member selected from the group consisting of compounds of the formula

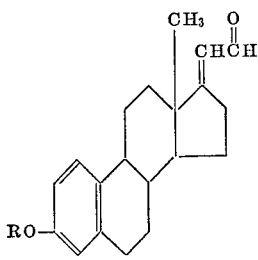

and the enol esters thereof represented by the formula

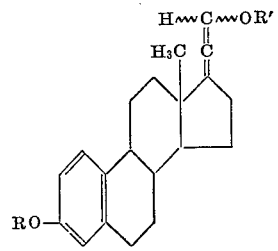

R in those formulae denoting hydrogen or a lower alkyl or lower alkanoyl radical and R' a lower alkanoyl radical.

2. As in claim 1, a compound of the formula

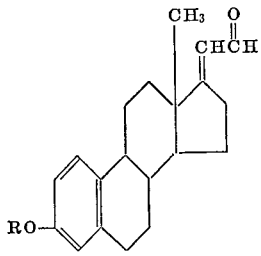

wherein R is hydrogen or a lower alkyl or lower alkanoyl radical.

3. As in claim 1, a compound of the formula

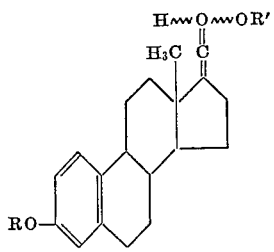

wherein R is hydrogen or a lower alkyl or lower alkanoyl radical and R' is a lower alkanoyl radical.

4. As in claim 1, a compound of the formula

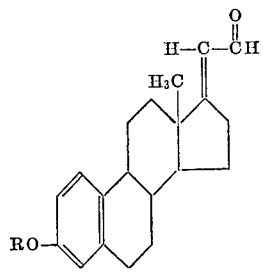

wherein R is hydrogen or a lower alkyl or lower alkanoyl radical.

5. As in claim 1, a compound of the formula

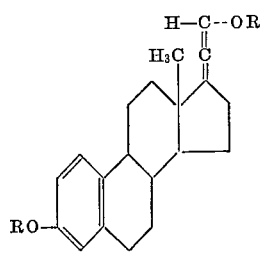

wherein R is hydrogen or a lower alkyl or lower alkanoyl radical and R' is a lower alkanoyl radical.

6. As in claim 1, the compound which is trans-3-hydroxy-19-norpregna-1,3,5(10),17(20)-tetraen-21-al.

7. As in claim 1, the compound which is 19-norpregna-1,3,5(10),17(20),20-pentaene-3,21α-diol 21-acetate.

8. As in claim 1, the compound which is 19-norpregna-1,3,5(10),17(20),20-pentaene-3,21α-diol 3,21-diacetate.

9. As in claim 1, the compound which is 21-acetoxy-19-norpregna-1,3,5(10),17(20),20-pentaen-3-ol 3 - methyl ether.

10. As in claim 1, the compound which is 3-methoxy-19-norpregna,1,3,5(10),17(20)-tetraen-21-al.

References Cited

UNITED STATES PATENTS 3,057,888  10/1962  Marbet et al. _____ 260—397.47
3,374,253  3/1968   Fried _____ 260—397.3

ELBERT L. ROBERTS, *Primary Examiner.*

U.S. Cl. X.R.

260—397.5